UNITED STATES PATENT OFFICE 2,629,692

GREASE

Hubert J. Liehe, Hammond, Ind., assignor to Standard Oil Company, Chicago, Ill., a corporation of Indiana No Drawing. Application October 13, 1950,
Serial No. 190,040

8 Claims. (Cl. 252—33.2)

This invention relates to improvements in greases and more particularly pertains to improved stabilized alkaline earth soap greases, and to the method of preparing the same.

It is an object of the present invention to provide a grease having good temperature-consistency characteristics.

Another object of this invention is to provide a grease possessing unique thermal reversibility.

A further object of the present invention is to provide a mechanically stable grease, resistant to oil leakage.

Another object of the invention is to provide a method of preparing a grease having the foregoing properties.

Other objects and advantages of the invention will become apparent from the following description thereof.

In accordance with the present invention greases of the above-described characteristics are obtained by using a substantially anhydrous grease comprising essentially an alkaline earth fat or fatty acid soap, an alkaline earth soap of a preferentially oil-soluble sulfonic acid and a viscous hydrocarbon oil, i. e. an oil having a Saybolt Universal viscosity at 100° F. of at least about 60 seconds. By "substantially anhydrous" grease is meant a grease composition containing less than 0.1% water. Alkaline earth soaps such as calcium, barium or strontium or mixtures thereof can be used, although I prefer to use the calcium soaps.

The fat or fatty acid soaps, used in the grease of the present invention in amounts of from about 1% to about 15% and preferably from about 2.0% to about 10% by weight are suitably the soaps of non-drying fats and/or unsaturated, partially unsaturated or saturated high molecular weight fatty acids having at least 12 carbon atoms and suitably 12 to 22 carbon atoms. Examples of suitable fats and fatty acids are tallow, lard, acidless tallow oil, lard oil, lauric acid, palmitic acid, stearic acid, oleic acid, cottonseed fatty acid, animal fatty acids, behenic acid, hydrogenated fish oil fatty acids and the fatty acid pitches obtained therefrom, standard fatty acids, menhaden fatty acids, etc. The standard fatty acids is a product well known in the grease making trade comprising about 40% animal fatty acids and about 60% cottonseed fatty acids. Fats and fatty acids of the foregoing type will be referred to hereinafter as "fatty material."

The preferentially oil-soluble sulfonic acid soaps employed in accordance with the present invention in amounts of from about 0.25% to about 15%, and preferably from about 0.5% to about 10% by weight are preferably those obtained in the treatment of hydrocarbon oils, such as petroleum lubricating oils, with strong sulfuric acid, i. e. concentrated sulfuric acids of about at least 95% strength or fuming sulfuric acid. I may also use alkaline earth soaps of other preferentially oil-soluble sulfonic acids, such as those obtained by the sulfonation of olefin polymers having at least about 22 carbon atoms in the molecule or those obtained by the sulfonation of alkylated aromatics having at least about 19 carbon atoms in the alkyl group.

The preferentially oil-soluble petroleum sulfonates are preferably those obtained in the treatment of petroleum oils to obtain highly refined products of the type of electrical insulating oils, turbine oils, medicinal white oils, technical while oils, etc., in which the petroleum oils are treated successively with a number of portions of concentrated sulfuric acid (i. e., above about 95% strength), or fuming sulfuric acid. A variety of sulfur-containing compounds are formed by the chemical reactions of sulfuric acid upon the oil, including sulfonic acids, organic esters of sulfuric acid, partial esters of sulfuric acid, etc. Most of these compounds are relatively insoluble in the oil under the treating conditions and separate from the oil together with unreacted sulfuric acid as a sludge, which is separated from the oil after each treatment. The sulfuric acid is usually added in "dumps" of about one-half pound per gallon of the oil, the total quantity of the acid added depending upon the oil being treated and the desired final product. Usually from about three pounds to about nine pounds of sulfuric acid per gallon of oil are used. Some of the sulfonic acids resulting from the treatment of the oil with the sulfuric acid are preferentially oil-soluble and remain in the oil layer after removal of the acid sludge. These can be removed from the oil by neutralizing the acid-treated oil with an alkaline agent, such as oxides, hydroxide or carbonate of an alkaline earth, for example, CaO, to form sulfonic acid soaps or sulfonates which are then extracted from the oil by treatment with 50% to 80% aqueous alcohol solutions or other suitable means. Because of the characteristic mahogany color of these sulfonates they are known in the petroleum art as mahogany soaps. While the majority proportions of the preferentially oil-soluble sulfonates are obtained from the acid-treated oil there can be recovered from the acid sludge, by suitable solvents, preferentially oil-soluble sulfonates or sulfonic acids. The term "preferentially oil-soluble" sulfonates therefore includes the oil-soluble sulfonates from both the acid-treated oil and the acid sludge.

While any of the preferentially oil-soluble sulfonates can be used, I prefer to employ those obtained from oil-soluble sulfonic acids having combined weights in the range of from about 350 to about 525, and particularly in the range of about 420 to 450. The combining weights of the oil-soluble petroleum sulfonic acids vary with the viscosity of the oil being acid-treated and the total amount of sulfuric acid employed. To a certain degree the type of preferentially oil-soluble petroleum sulfonic acid obtained will also depend upon the type of crude oil from which the acid-treated oil is obtained. For example, preferentially oil-soluble sulfonic acids obtained in treating a petroleum distillate having a Saybolt Universal viscosity at 100° F. of from about 60 seconds to about 230 seconds with 3 to 5 pounds of fuming sulfuric acid, have combining weights of about 430, while the preferentially oil-soluble sulfonic acids obtained when treating petroleum distillates having Saybolt Universal viscosities at 100° F. of from about 220 seconds to about 800 seconds with from about three to about nine pounds of fuming sulfuric acid per gallon of oil have combining weights of from about 470 to about 500. The crude sulfonic soap obtained in this manner contains from about 30% to about 60% sulfonate, from about 30% to about 60% oil, from about 1% to about 10% water, and up to 10% inorganic salts which may be removed by the procedure hereinafter described.

The crude soaps of these preferentially oil-soluble sulfonic acids obtained by the procedure described above may be freed of inorganic salts by purification. This purification is preferably accomplished by dilution of the crude soap with from about ½ to about 10 parts, preferably 1 to 2 parts of 50% or higher strength alcohol, preferably alcohol of 60% to 70% strength and allowing the salts to settle while maintaining the mixture within the temperature range of 130° F. to 175° F., preferably 155° F. to 165° F. When the salts have settled the supernatant alcohol-soap layer is separated and the alcohol is recovered by conventional distillation procedure. By this method of purification the salt content of the crude sulfonic soap can be readily reduced to 5% or less.

While the ratio of sulfonate to the soap of fatty material can be varied from about 1:2 to 2:1, I prefer to employ them in a ratio of about 1:1.

The hydrocarbon oil constituent, used in amounts of from about 50% to about 95%, and preferably from about 75% to about 95% can be a synthetic or natural hydrocarbon oil, for example, petroleum oil, in the viscosity range of from about 60 seconds at 100° F. to about 500 seconds at 210° F., Saybolt Universal. The viscosity of the oil used will be dependent upon the intended use or service for the grease.

Greases of the present invention are prepared by mixing all of the alkaline earth sulfonate, an amount of the oil approximately equal to that of the sulfonate, and the basic alkaline earth reagent substantially that required to neutralize or saponify the fatty material and heating the mixture to a temperature of from about 250° F. to about 325° F. until the mixture is substantially dry—that is, substantially free of water. In general, the grease is only slightly acidic or basic, that is not more than 0.3% acidic or basic expressed as oleic acid or sodium hydroxide. The fatty material is then gradually added and the product dried at a temperature of about 300° F. to 325° F. The remaining portion of the oil is then added while maintaining a temperature of about 250° F. to 300° F. until all of the oil is graded in and the finished grease filled.

Greases of the present invention are normally anhydrous products comprising essentially hydrocarbon oil, an alkaline earth sulfonate, and an alkaline earth soap of a fat or fatty acid. However, relatively small amounts of other well known additives can be added to the grease composition without departing from the spirit of the invention. Such additives are, for example, 0.1 to 1% of a pourpoint depressor, such as Paraflow, Pourex, etc., from 1% to 4% of an E. P. agent, such as halogenated and/or sulfurized compounds, from 0.1% to 1% of an antioxidant such as for example, phenyl alpha naphthylamine, naphthols, etc., a corrosion inhibitor, mica, graphite, etc.

A typical grease product is illustrated by the following example:

Example I

| | Per cent |
|---|---|
| Calcium soap of preferentially oil-soluble petroleum sulfonic acid | 3 |
| Calcium soap of hydrogenated tallow acids | 3 |
| Petroleum oil (S. U. S. at 100° F.—645) | 94 |
| Water (by A. S. T. M. Test D-128-47) | 0 |

Greases of the above composition have a viscosity of 490 Brabender units at 77° F.

Example II

| | Per cent |
|---|---|
| A calcium soap of preferentially oil-soluble petroleum sulfonic acid | 3 |
| Calcium soap of hydrogenated tallow acid | 3 |
| Pourpoint depressor (Pourex) | 0.5 |
| E. P. agent (chlorinated compound) | 2.5 |
| Antioxidant (phenyl alpha naphthylamine) | 0.5 |
| Petroleum oil (S. U. S. at 100° F., 210-215) | 90.5 |
| Water (by A. S. T. M. D-128-47) | 0 |

The above product had an unworked A. S. T. M. penetration at 77° F. of 348 and a worked penetration of 350, with a 38 gram cone, and a viscosity of 435 Brabender units at 77° F. In the above illustrated examples, soap of the other alkaline earth metals, i. e. barium and strontium can be used in place of the calcium soaps, or mixtures of such soap can be used.

Grease compositions similar to that of Example I but containing 2%, each of the sulfonate and calcium fatty acid soap are semi-fluid and flow at room temperatures and still maintain their viscous grease-like structure at temperatures of 275° to 300° F. Other grease products containing 8% of the calcium sulfonate, 8% of the calcium fatty acid soap have a drop point of 288° F. These greases, even when heated to temperatures as high as 325° F. will, upon cooling, return to their original consistency and structure. The greases are also extremely resistant to oil separation. Greases of the herein described type find particular utility as steering gear greases, and as wringer gear lubricants.

While the present invention has been described by reference to the preferred embodiments thereof, the same has been given by way of illustration only and are not intended to be limited thereto, but includes within its scope such modifications and variations as come within the spirit of the appended claims.

I claim:

1. An anhydrous grease containing less than 0.1% water, consisting essentially of from 0.25% to 15% of an alkaline earth soap of a preferentially oil-soluble sulfonic acid, from about 1% to about 15% of an alkaline earth soap of a fatty material, and a viscous hydrocarbon oil, said alkaline earth soap of a preferentially oil-soluble sulfonic acid and said alkaline earth soap of a fatty material being used in a ratio of from about 1:2 to 2:1.

2. An anhydrous grease described in claim 1 in which the preferentially oil-soluble sulfonic acid is a preferentially oil-soluble petroleum sulfonic acid.

3. An anhydrous grease containing less than about 0.1% water consisting essentially of from 0.25% to about 15% of a calcium soap of a preferentially oil-soluble sulfonic acid, from about 1% to about 15% of a calcium soap of a fatty acid having at least 12 carbon atoms and from about 50% to about 95% of a petroleum lubricating oil, said calcium soap of a preferentially oil-soluble sulfonic acid and said calcium soap of a fatty acid being used in a ratio of from about 1:2 to 2:1.

4. An anhydrous grease containing less than 0.1% water, consisting essentially of from about 0.25% to about 15% of barium soap of a preferentially oil-soluble sulfonic acid, from about 1% to about 15% barium soap of a fatty material and from about 50% to about 95% of a petroleum lubricating oil, said barium soap of a preferentially oil-soluble sulfonic acid and said barium soap of a fatty material being used in a ratio of from about 1:2 to 2:1.

5. An anhydrous grease containing less than about 0.1% water consisting essentially from about 0.25% to about 15% of a calcium soap of a preferentially oil-soluble petroleum sulfonic acid, from about 1% to about 15% of a calcium soap of standard fatty acids, and from about 50% to about 95% of a petroleum lubricating oil.

6. An anhydrous grease containing less than about 0.1% water consisting essentially of 3% calcium soap of a preferentially oil-soluble petroleum sulfonic acid, 3% calcium soap of hydrogenated tallow acids, and about 94% of a petroleum lubricating oil.

7. An anhydrous grease containing less than about 0.1% water consisting essentially of from about 0.25% to about 15% of an alkaline earth soap of a preferentially oil-soluble sulfonic acid, from about 1% to about 15% of an alkaline earth soap of a fatty material, and from about 50% to about 95% of a viscous hydrocarbon oil, said alkaline earth soap of a preferentially oil-soluble sulfonic acid and said alkaline earth soap of a fatty material, being used in a ratio of from about 1:2 to 2:1.

8. A substantially anhydrous grease containing less than about 0.1% water consisting essentially of from 0.25% to about 15% calcium soap of a preferentially oil-soluble petroleum sulfonic acid, from about 1% to about 15% of a calcium soap of a fatty material, from about 0.1% to about 4% of a pourpoint depressor, from about 0.1% to about 1% of an antioxidant, from about 1% to about 4% of an extreme pressure agent, and from about 50% to about 95% of a petroleum lubricating oil, said calcium soap of a preferentially oil-soluble petroleum sulfonic acid and said calcium soap of a fatty material being used in a ratio of from about 1:2 to 2:1.

HUBERT J. LIEHE.

REFERENCES CITED

The following references are of record in the file of this patent:

UNITED STATES PATENTS

| Number | Name | Date |
| --- | --- | --- |
| 1,888,974 | Becker | Nov. 29, 1932 |
| 2,113,754 | Zimmer et al. | Apr. 12, 1938 |
| 2,394,790 | Liehe | Feb. 12, 1946 |